E. KEMP.
VEHICLE WHEEL.
APPLICATION FILED MAY 17, 1919.
1,383,991.
Patented July 5, 1921.
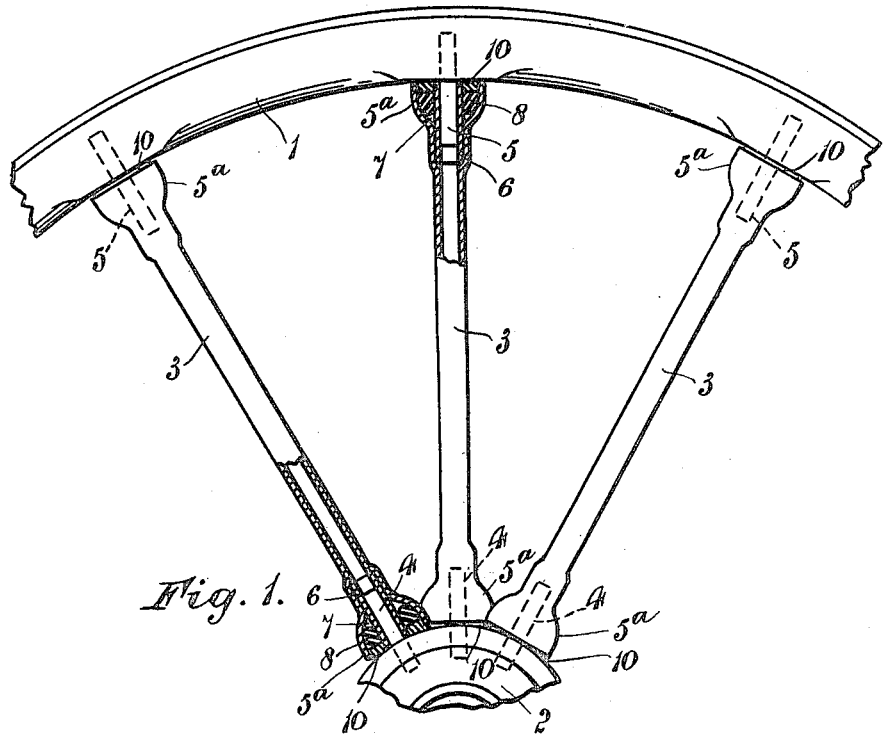
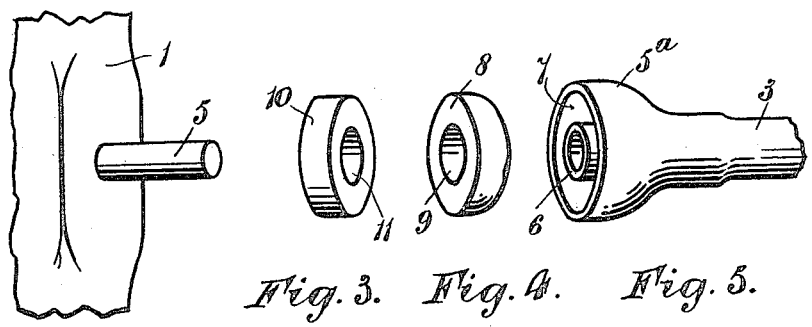
Fig. 3.  Fig. 4.  Fig. 5.
Fig. 2.
Inventor
Edward Kemp.
By Stanley Lightfoot.
Attorney

UNITED STATES PATENT OFFICE.

EDWARD KEMP, OF TORONTO, ONTARIO, CANADA, ASSIGNOR OF ONE-THIRD TO GEORGE WHITAKER MORLEY, OF TORONTO, ONTARIO, CANADA.

VEHICLE-WHEEL.

1,383,991.            Specification of Letters Patent.        Patented July 5, 1921.

Application filed May 17, 1919. Serial No. 297,845.

*To all whom it may concern:*

Be it known that I, EDWARD KEMP, of the city of Toronto, in the county of York, in the Province of Ontario, in the Dominion of Canada, have invented certain new and useful Improvements in Vehicle-Wheels; and do hereby declare that the following is a full, clear, and exact description of the same.

This invention has reference to wheels, having for its object to provide for the use of metal, more particularly tubular, spokes, in a simple and efficient manner while maintaining strength and resiliency in the wheel. A further object is to provide for the use in such construction of resilient cushions between the spoke and the felly, or between the spoke and hub, or between the spoke and both the felly and the hub, in a protected manner, whereby access of deleterious matter to said cushions is prevented and their durability prolonged.

Further objects subsidiary to or resulting from the aforesaid objects, or from the construction or operation of the invention as it may be carried into effect, will become apparent as the said invention is hereinafter further disclosed.

In carrying the said invention into effect, I may provide, in combination with a felly and a hub of any suitable material or construction, metal spokes (preferably tubular), connecting means between the spokes and the felly and hub of the wheel, such connecting means permitting a certain radial movement of the spokes with respect to the felly or to the hub, or to both the felly and the hub, cushion compartments at one or both ends of the said spokes as may be desired, resilient cushions, such as of rubber, accommodated in the said cushion compartments, and slidable closures for the outer ends of the said compartments, said closures bearing upon the said resilient cushion and upon the felly, or the hub, as the case may be, whereby the cushions are compressed in their compartments and the spokes resiliently supported with respect to the felly or the hub, or both the felly and the hub of the wheel; all of which is more particularly described and ascertained, by way of example, in and by the following description of the accompanying drawing, in which:—

Figure 1 is a fragmentary elevation of a wheel, two of the spokes being shown part in section.

Fig. 2 is a fragmentary perspective view of that part of the felly to which a spoke is applied.

Fig. 3 is a perspective view of one of the closures for the cushion compartment of the spoke.

Fig. 4 is a perspective view of a cushion, and

Fig. 5 is a perspective view of the end of a spoke, showing the cushion compartment.

The Figs. 2, 3, 4, and 5 illustrate the parts, included in the connection between the felly and spoke, in their relative positions prior to assembling, the said figures being drawn to a larger scale than is Fig. 1.

Similar characters of reference indicate similar parts in the several figures of the drawing.

In the arrangement shown, 1 is the felly and 2 the hub of a wheel, 3, being tubular spokes, preferably of metal or such other material of adequate strength and durability for the purpose, the ends of said spokes being connected to the hub and to the felly by means of pins or projections, 4, and 5, respectively. The connection between the spokes and the felly and the hub, is of a sliding nature with respect to both the felly and the hub, or either the felly or the hub, as desired; that is to say, in the arrangement as illustrated, the pins at either one or both ends of the spokes are slidably accommodated in the said spokes (or in the hub or the felly, or both the hub and the felly), whereby a certain limited radial deviation between the spokes and the hub or the felly is possible.

In the drawing the ends of the pins are shown as being accommodated in short tubes 6, secured in the ends of the spokes, and the said spokes are shown as being cupped at their ends $5^a$, to provide compartments 7, which are adapted to receive resilient cushions 8, these, in the present arrangement, being in the form of disks, of rubber or other such suitable material, each disk having a central orifice 9 therein to permit passage over the tubes 6 of the spokes.

10, are closures for the said compartments, said closures being in the form of metal, fiber, or other suitable washers having each a central orifice 11 and adapted to be passed into the open ends of the annular compartments 7. The thickness of the closures 10, is such that, when the cushions 8, are located in the compartments 7, and the said closures positioned thereon, they will extend beyond the open ends of the said compartments; and the closures being slidable in the said compartments they will, therefore, compress the cushions when the felly, or the hub, against which said closures bear when in position, is moved toward or tends to compress the spokes between the said felly and the hub.

The arrangement of resilient cushions in their compartments may be, if desired, applied only to that end of the spoke which is radially movable with respect to the hub, or to the felly as the case may be, or to both ends of the spokes when such spokes are radially movable with respect to both the hub and the felly.

It has been a common practice to make the fellies of wheels in two or more sections connected together at their ends, so that in the device illustrated the outer ends of the spokes may be brought or sprung into alinement with the pins 5, after which the sections may be drawn together and secured. In this way the pins secured in the felly will be caused to enter the spokes.

The dimensions of the parts illustrated are not necessarily indicative of the actual proportions of the said parts, and it will be understood that, where a wheel is assembled according to the construction suggested, considerable initial compression of the cushions may be effected and the consequent radial movement of the spokes with respect to the hub or to the felly may be very slight but none the less effective. Further, the actual clearance between the cupped ends of the spokes and the hub, or the felly, may be very slight.

This invention may be developed within the scope of the following claims without departing from the essential features of the said invention and it is desired that the specification and drawing be read as being merely illustrative and not in a limiting sense, except as necessitated by the prior art.

What I claim as my invention is:—

1. In a wheel, a spoke, a radially slidable connection between the end of said spoke and the contiguous part of said wheel, a cushion compartment at the end of said spoke, a resilient cushion within said compartment, and a slidable closure for said compartment, said closure and said cushion being compressively located between the walls of said compartment and the contiguous part of said wheel.

2. In a wheel, a spoke, the end of said spoke being cupped to form a cushion compartment, a radially slidable connection between the end of said spoke and the contiguous part of said wheel, a resilient cushion within said compartment, and a slidable closure for said compartment, said closure bearing upon said cushion and against said part of the wheel contiguous to said spoke end whereby said spoke end is resiliently spaced from the said contiguous part of the wheel.

3. In a wheel, a tubular metal spoke, a cup on the spoke end, the mouth of said cup opening toward the part of said wheel contiguous to said spoke end, a resilient cushion within said cup, a closure for the mouth of said cup, said closure bearing upon said cushion and extending beyond the mouth of said cup, and a slidable connection between said spoke end and the contiguous part of said wheel whereby expansion and contracting of said cushion is permitted.

4. In combination with the felly of a wheel, radial spokes, radially slidable connections between the outer ends of said spokes and said felly, cushion compartments at the said outer ends of said spokes, resilient cushions within said compartments, and slidable closures for said compartments, said closures and said cushions being compressively located between the walls of said compartments and said felly.

5. In combination with the felly and hub of a wheel, radial spokes, radially slidable connections between the ends of said spokes and said hub and said felly, cushion compartments at the inner and outer ends of said spokes, resilient cushions within said compartments, and slidable closures for said compartments, said closures and said cushions being compressibly located between the walls of said compartments at the outer ends of said spokes and said felly, and between the walls of said compartments at the inner ends of said spokes and said hub.

6. In combination with the hub of a wheel, radial spokes, radially slidable connections between the ends of said spokes and said hub, cushion compartments at the said ends of said spokes, resilient cushions within said compartments, and slidable closures for said compartments, said closures, and said cushions being compressibly located between the walls of said compartments and said hub.

7. In a device of the type described, a tubular spoke having a central tubular portion at its end adapted to receive a connecting pin, an outwardly opening cup around said central portion at the ends of said spoke, a resilient cushion located within said cup, and a slidable closure for said cup, said closure bearing upon said cushion and projecting from said cup.

8. In a device of the type described, a tubular spoke having its end expanded to form a cup, radial spoke-connecting means within said cup, an annular resilient cushion surrounding said connecting means and located within said cup, and a slidable closure for said cup said closure being superimposed upon said cushion and projecting from said cup.

Signed at the city of Toronto, in the county of York, in the Province of Ontario, in the Dominion of Canada, this 22d day of April, 1919.

EDWARD KEMP.